United States Patent
Prata et al.

(10) Patent No.: US 10,067,525 B2
(45) Date of Patent: Sep. 4, 2018

(54) GENERIC CONFIGURABLE ELECTRIC PART

(71) Applicant: SAFRAN ELECTRONICS & DEFENSE, Boulogne Billancourt (FR)

(72) Inventors: Antonio Prata, Boulogne Billancourt (FR); Damien Le Bail, Boulogne Billancourt (FR); Jean-Luc Manca, Boulogne Billancourt (FR)

(73) Assignee: SAGEM DEFENSE SECURITE, Boulogne Billancourt (FR)

( * ) Notice: Subject to any disclaimer, the term of this patent is extended or adjusted under 35 U.S.C. 154(b) by 209 days.

(21) Appl. No.: 14/647,764

(22) PCT Filed: Nov. 22, 2013

(86) PCT No.: PCT/EP2013/074514
§ 371 (c)(1),
(2) Date: May 27, 2015

(87) PCT Pub. No.: WO2014/082936
PCT Pub. Date: Jun. 5, 2014

(65) Prior Publication Data
US 2015/0309489 A1 Oct. 29, 2015

(30) Foreign Application Priority Data
Nov. 28, 2012 (FR) .................................. 12 03215

(51) Int. Cl.
| | |
|---|---|
| G05B 15/02 | (2006.01) |
| G05F 1/66 | (2006.01) |
| H02J 13/00 | (2006.01) |
| G05B 19/042 | (2006.01) |
| G05B 19/05 | (2006.01) |

(52) U.S. Cl.
CPC ........... G05F 1/66 (2013.01); G05B 19/0426 (2013.01); G05B 19/056 (2013.01); H02J 13/00 (2013.01); Y02B 70/3241 (2013.01); Y04S 20/227 (2013.01)

(58) Field of Classification Search
CPC ....................................................... G05B 15/02
USPC .................................................. 318/34, 558
See application file for complete search history.

(56) References Cited

U.S. PATENT DOCUMENTS

| | | | |
|---|---|---|---|
| 5,621,294 A * | 4/1997 | Bessette | ................ H02P 25/098 318/573 |
| 6,107,696 A | 8/2000 | Peter et al. | |

(Continued)

FOREIGN PATENT DOCUMENTS

EP 1 449 095 A1 6/2003

*Primary Examiner* — David S Luo
(74) *Attorney, Agent, or Firm* — Muncy, Geissler, Olds & Lowe, P.C.

(57) ABSTRACT

A configurable generic electrical member includes a processor means for performing at least one configured function in order to generate output signals for at least one piece of electrical equipment. The processor means includes a fast processor unit and a slow processor unit in which functional blocks are implemented, which blocks are arranged respectively to perform relatively fast operations and relatively slow operations, in that the functional blocks are independent and parameterizable, and in that the processor units are configurable to parameterize and interconnect the functional blocks selectively in such a manner as to perform the configured function.

10 Claims, 5 Drawing Sheets

(56) References Cited

U.S. PATENT DOCUMENTS

| | | | |
|---|---|---|---|
| 7,112,931 B2 * | 9/2006 | Kitajima | H02P 27/08 318/114 |
| 7,135,827 B1 * | 11/2006 | Lampson | H02M 7/003 318/135 |
| 7,679,308 B2 * | 3/2010 | Tomigashi | H02P 21/14 318/400.02 |
| 2002/0108006 A1 | 8/2002 | Snyder | |
| 2004/0027254 A9 | 2/2004 | Kirstein | |
| 2005/0154475 A1 | 7/2005 | Forchert et al. | |

\* cited by examiner

GENERIC CONFIGURABLE ELECTRIC PART

The invention relates to a configurable generic electrical member comprising processor means for performing at least one configured function in order to generate output signals for at least one piece of electrical equipment.

BACKGROUND OF THE INVENTION

The ever "more electric" development of airplanes constitutes one of the major challenges for research and innovation policies undertaken by the aviation industry. Electrical energy offers numerous advantages compared with energy that is mechanical, hydraulic, or pneumatic, including improved equipment integration, reduced maintenance costs, simplified use, reduced weight, etc.

Major civil or military programs give opportunities for introducing technological changes serving to replace conventional systems with electrical systems. Among the most striking changes, mention may be made of the introduction of electrical "fly-by-wire" controls on the Airbus A320, electrical thrust reversal on the Airbus A380, electrical braking on the Boeing 787, etc.

The development of electrical systems has led to a large increase in the number of electromechanical actuators that, in order to operate, require in particular control members and power converter members. Control members are used to control inverters associated with the electric motors of the electromechanical actuators as a function of setpoints and of a variety of measurements (rotor position, angular speed, etc.). The power converter members are used for delivering direct current (DC) power supply voltages (e.g. at 28 volts) or alternating current (AC) power supply voltages (e.g. 115/230 volts-400 hertz) to pieces of electrical equipment. Those control and converter members generally make use of servo-control, making it necessary to acquire measurements using sensors for sensing linear or angular position, speed, current, voltage, etc.

Each application requires control and power converter members having certain characteristics that depend on the application (generating control laws, values or frequencies for output voltages, etc.). It is therefore necessary for each new application to make new pieces of equipment, and that represents cost that is high in terms of development, certification, and fabrication of those pieces of equipment, and leads to uncertainties as to the performance of such new equipment in terms of safety and reliability.

OBJECT OF THE INVENTION

An object of the invention is to reduce the costs and the time required for developing electrical systems while improving their reliability.

SUMMARY OF THE INVENTION

In order to achieve this object, the invention proposes a configurable generic electrical member comprising processor means for performing at least one configured function in order to generate output signals for at least one piece of electrical equipment. According to the invention, the processor means comprise a fast processor unit and a slow processor unit in which functional blocks are implemented, which blocks are arranged respectively to perform relatively fast operations and relatively slow operations. The functional blocks are independent and parameterizable, and the processor units are configurable to parameterize and interconnect the functional blocks selectively in such a manner as to perform the configured function.

It is thus possible to use an electrical member that has already been developed, qualified, and certified in order to implement a new function, by merely reconfiguring the processor units. This makes it possible to: reduce design costs since functional blocks that have already been made are reused; reduce costs associated with the activities of validation, verification, and certification, since for the new function these activities relate only to the new parameter settings and to the new interconnections; and reduce uncertainties about the performance of the equipment, since the performance of the processor units and of the functional blocks have already been tested.

The invention can be better understood in the light of the following description of a particular, non-limiting embodiment of the invention.

BRIEF DESCRIPTION OF THE DRAWINGS

Reference is made to the accompanying drawings, in which.

DETAILED DESCRIPTION OF THE INVENTION

Figure 1:
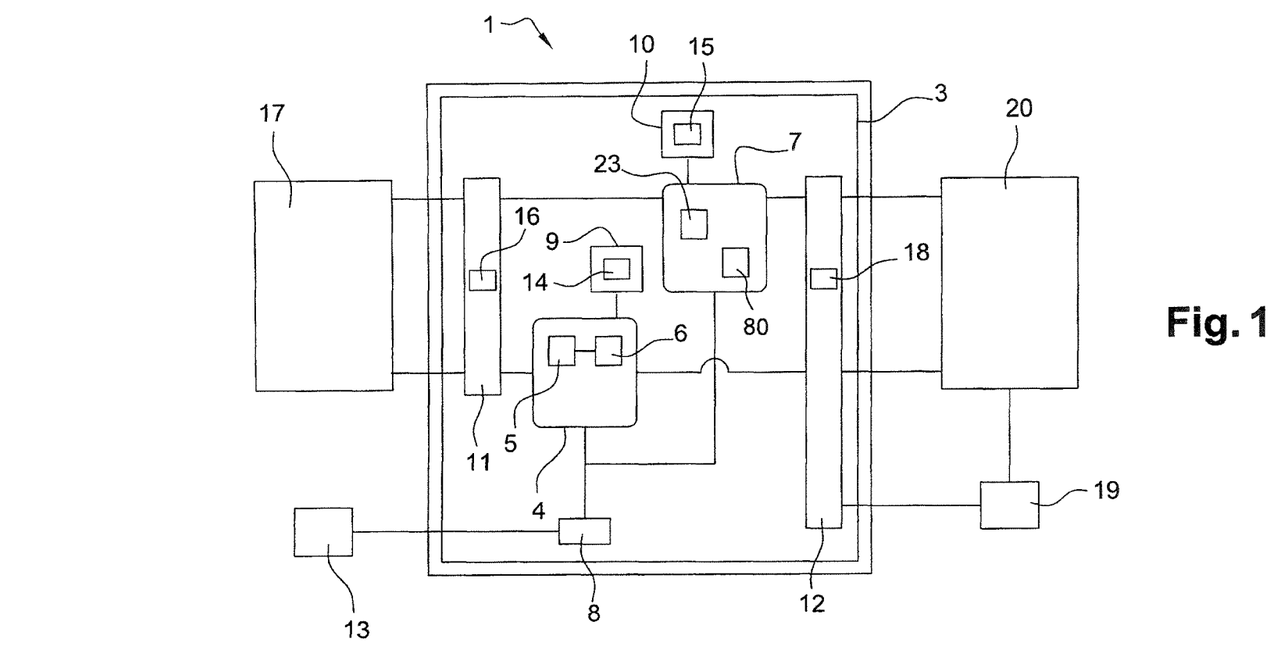
FIG. 1 is a diagram of a configurable generic electrical member of the invention.

With reference to FIG. 1, a configurable generic electrical member 1 of the invention comprises a unit 2 having at least one circuit card 3 mounted therein. The circuit card 3 has electrical components including a field-programmable gate array (FPGA) 4 having random access memory (RAM) space 5 connected to non-volatile memory 6 incorporated in the FPGA, a microcontroller 7 having a processor 80 and a non-volatile memory zone 23, a power supply module 8, clock components 9, 10, communication interface components 11, and analog acquisition interface components 12.

The power supply module 8 of the circuit card 3 is connected to an external power source 13 and is arranged to power the components of the circuit card 3 by supplying one or more appropriate power supply voltages. The clock components 9, 10 comprise two crystal oscillators 14, 15, one 14 of which supplies a stabilized clock signal to the FPGA 4, and the other of which 15 supplies a stabilized clock signal to the microcontroller 7. The communication interface components 11, which include in particular a transceiver component 16 for a connection of the ARINC429 type, for example, or any other type of connection, are used for shaping digital signals that are exchanged between the FPGA 4, the microcontroller 7, and a first equipment set 17 that is external to the electrical member 1. The analog acquisition interface components 12, which include at least an analog-to-digital converter 18, are arranged to enable the FPGA 4 and the microcontroller 7 to have access to measurements taken by a set of external sensors 19 connected to a second external equipment set 20, or to have access to analog signals (currents, voltages) coming directly from the second external equipment set 20.

The electrical member 1 of the invention may be configured to perform a monitoring/control function, e.g. a function of controlling an electric motor of an electromechanical actuator, or a power conversion function serving to convert a DC voltage or an AC voltage into a DC or an AC voltage (it is thus possible to perform DC/DC, DC/AC, AC/AC, or AC/DC conversion).

For this purpose, functional blocks (shown in FIG. 2) are implemented in the FPGA 4 and the microcontroller 7. The term "implemented" is used to mean that these functional blocks are coded by program codes arranged in memory zones associated with the FPGA and with the microcontroller, the code being executed by the FPGA and by the processor 80 of the microcontroller in order to perform operation. For an FPGA, execution consists in assembling individual logic cells making it up, and thus in physically implanting a logic function. For a microcontroller, the operation is performed by performing software instructions within an unchanging hardware architecture.

Figure 2:
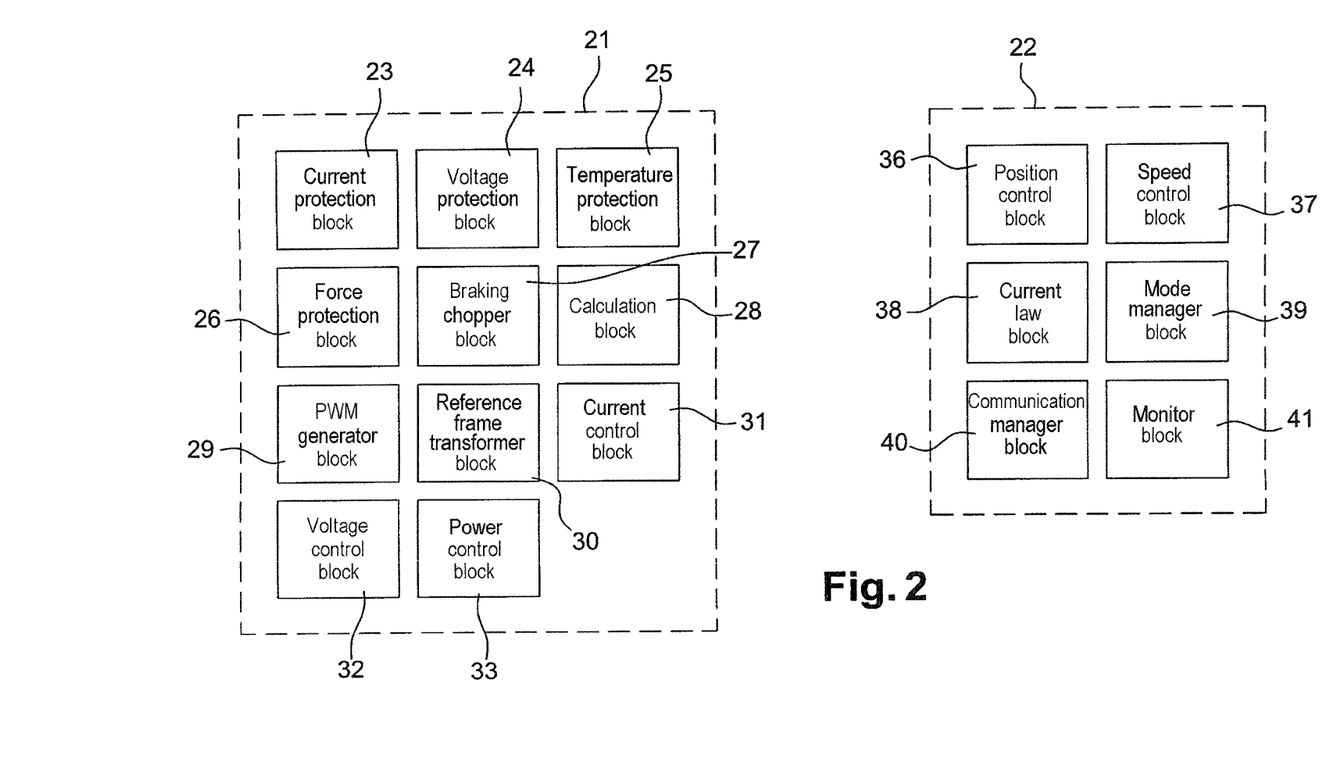
FIG. 2 shows functional blocks implemented in an FPGA and in a microcontroller of the electrical member of the invention.

Each functional block is designed to perform an operation. These functional blocks are independent, i.e. they do not need to be associated with other blocks in order to perform the operation for which they are designed. Furthermore, these blocks are parameterizable, i.e. it is possible to adapt the operations they perform to match the intended function, e.g. by changing values for thresholds, output voltages, frequency, etc.

By way of example, the functional blocks include a set 22 of functional blocks for performing operations that are relatively slow and that are implemented in the microcontroller 7, and a set 21 of functional blocks for performing operations that are relatively fast, and that are implemented in the FPGA 4. Programmable logic circuits make it possible to perform operations faster since their structure made up of interconnectable individual logic cells makes it possible firstly to obtain signal propagation times that are very short and secondly to perform a plurality of individual operations in parallel.

The non-parameterized functional blocks 21 of the FPGA 4 are stored in the internal non-volatile memory 6 of the FPGA. The non-parameterized functional blocks of the microcontroller 7 are stored in the non-volatile memory zone 23 of the microcontroller 7. In order to define the function performed by the electrical member 1, a user must enter a configuration program constituted by a sequence of software instructions into the non-volatile memory zone 23 of the microcontroller 7. The purpose of this configuration program is to parameterize (i.e. set the parameters of) the functional blocks 22 of the microcontroller 7, to load a parameterizing sequence in the RAM space 5 of the FPGA 4 in order to parameterize the functional blocks 21 of the FPGA 4, and to interconnect the parameterized functional blocks 21, 22 of the FPGA 4 and of the microcontroller 7 so as to perform the slow and fast operations that make up the desired function.

The functional blocks 21 implemented in the FPGA 4 comprise:

a current protection block 23, a voltage protection block 24, a temperature protection block 25, and a force protection block 26, that are arranged in known manner to protect the electrical member or external sensors or equipment against excessive levels of these parameters;

a braking chopper block 27 that is arranged to dissipate energy while braking an electric motor;

a calculation block 28 that is arranged to deduce measured parameter values as a function of a current or a voltage supplied by sensors and representative of the parameters;

a pulse width modulation (PWM) generator block 29 that is arranged to generate a signal of variable duty ratio for controlling an electric motor inverter;

a reference frame transformer block 30 that, depending on the way in which it is parameterized, is arranged to transform from a stationary reference frame associated with the stator of an electric motor to a rotary reference frame associated with the rotor of the motor, or vice versa, or from a three-phase reference frame to a two-phase reference frame, or vice versa; and a current control block 31, a voltage control block 32, and a power control block 33 that are arranged, on the basis of a current, voltage, or power setpoint, to supply a command for controlling the current, voltage, or power.

The functional blocks 22 implemented in the microcontroller 7 comprise:

a position control block 36 that is arranged to supply a speed setpoint for an electric motor as a function of a position setpoint and of a real position of the rotor of the motor;

a speed control block 37 that is arranged to supply a driving torque setpoint as a function of a speed setpoint and of the real speed of the rotor of the motor;

a current law block 38 that is arranged to supply a current command on the basis of any setpoint;

a mode manager block 39 that is arranged to manage different modes of a piece of equipment, such as stopping, or operating in a nominal, degraded, or maintenance mode, etc.;

a communication manager block 40 that is arranged to organize exchanges of data between the microcontroller and external equipment or some other component of the electrical member; and a monitor block 41 that is arranged to analyze various signals and to detect an operating anomaly of a component of the electrical member or of external sensors or equipment.

The blocks in question are themselves known.

Figure 3:
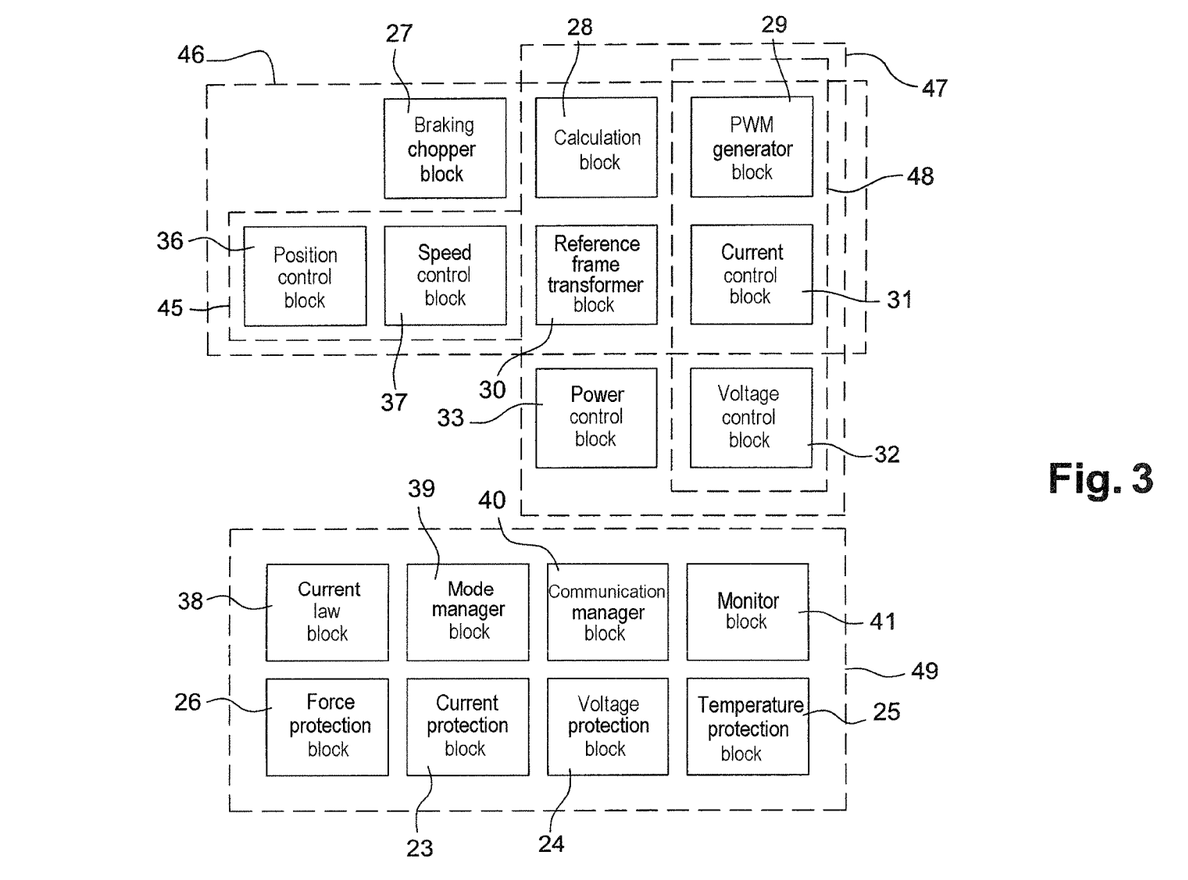
FIG. 3 shows the same blocks organized by the functions in which they are used.

In FIG. 3, the same functional blocks are arranged so as to define a first set 45 of blocks that are usable when the electrical member is configured to perform a motor control function, a second set 46 of blocks that are usable when the electrical member is configured to perform a DC/AC power conversion function or as a motor control member, a third set 47 for AC/DC or DC/AC conversion, a fourth set 48 for DC/DC conversion, and a fifth set 49 of blocks containing blocks that can be used by all of these functions.

Figure 4:
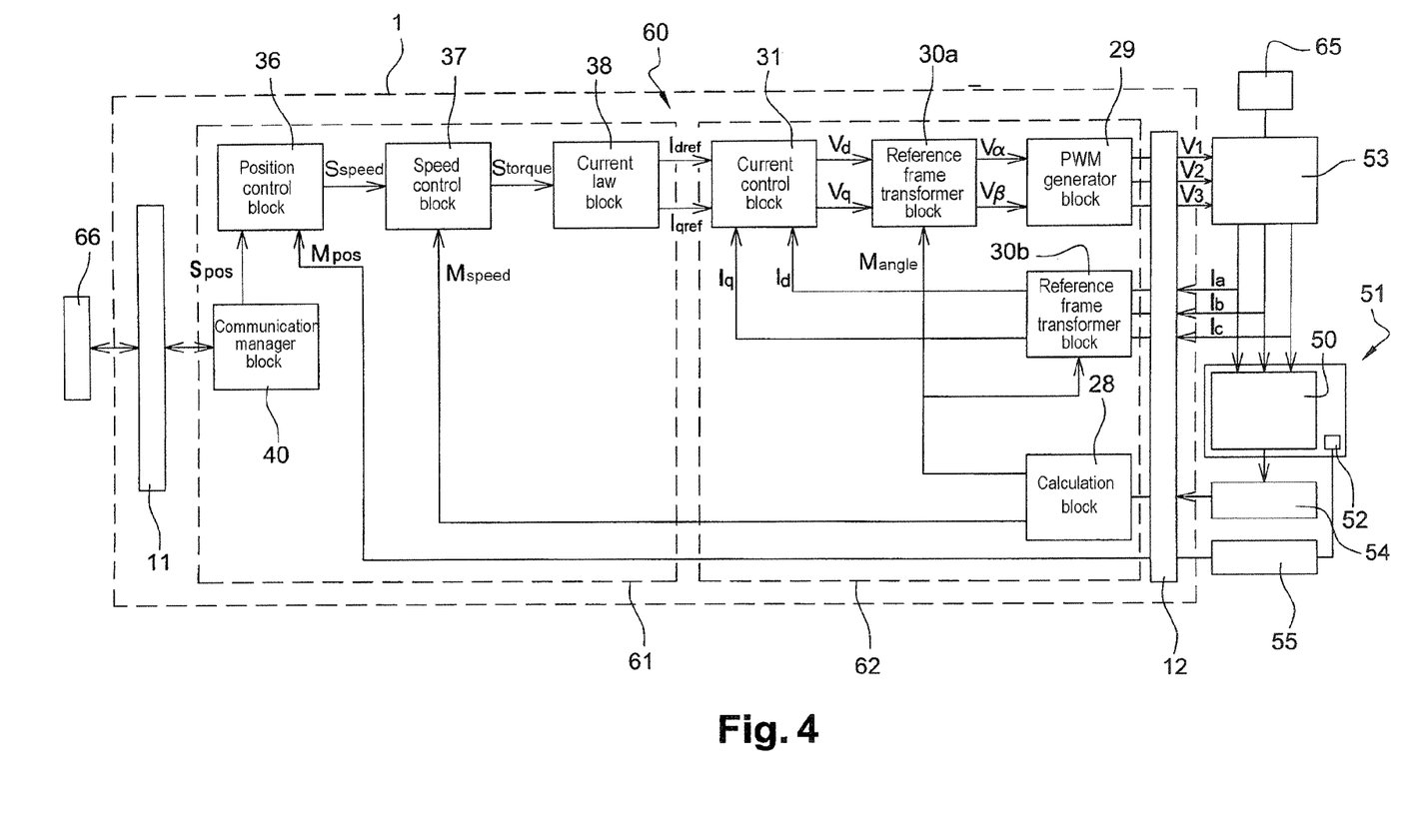
FIG. 4 shows an arrangement of functional blocks for performing a function of controlling an electric motor of an electromechanical actuator.

There follows a description of a particular arrangement of functional blocks as shown in FIG. 4 that enables an electrical member 1 to be used in an application to controlling a permanent magnet brushless synchronous electric motor 50 of an electromechanical actuator 51. This electromechanical actuator 51 serves to move linearly a rod 52 of an electromechanical latch. This type of latch may be used for latching the thrust reversers in flight in order to prevent them from opening in untimely manner.

The electrical member 1 is controlled by a control member 66 to control the motor 50 and to position the rod 52 of the actuator 51 as a function of a position setpoint Spos transmitted to the microcontroller 7 via the communication interface components 11 and a communication manager block 40. The electrical member is also connected via the analog acquisition interface components 12 to an inverter 53 controlling the electric motor 50, and to a sensor 54 for sensing the angular position of the rotor of the electric motor 50, specifically a sensor of the resolver type, and a sensor 55 for sensing the linear position of the rod 52. The inverter 53 is powered by a DC source 65.

In addition to the communication manager block 40, the functional blocks implemented in the microcontroller include a position control block 36, a speed control block 37, and a current law block 38.

The functional blocks implemented in the FPGA comprise a current control block 31, a first reference frame transformer block 30a parameterized to transfer from a rotary reference frame associated with the rotor of the motor to a stationary reference frame associated with the stator of the motor, a second reference frame transformer block 30b parameterized to transform from a three-phase reference frame to a two-phase reference frame, a PWM generator block 29, and a calculation block 28.

The position setpoint Spos for the rod 52 is transmitted to the position control block 36 that also receives the real position Mpos of the rod 52 as measured by the linear position sensor 55. Depending on the position setpoint Spos and the measured real position Mpos of the rod 52, the position control block 36 supplies a speed setpoint Sspeed to the speed control block 37. The speed control block 37 transmits a torque command Storque to the current law block 38, which command is determined as a function of the speed setpoint Sspeed and the real speed of rotation Mspeed of the rotor as generated by the calculation block 28 on the basis of measurements performed by the angular position sensor 54. On the basis of the torque setpoint Storque, the current law block 38 generates a two-phase current command Idref, Iqref in a rotary reference frame associated with the rotor of the motor, and transmits it to the current control block 31. The second transformer block 30b acquires a three-phase current Ia, Ib, Ic output by the inverter 53 and a measured angular position of the rotor Mangle supplied by the calculation block 28. The current control block 31 uses the setpoint Idref, Iqref and a current value Id, Iq transmitted by the second transformer block 30b to supply the first transformer block 30a with a two-phase voltage Vd, Vq in the rotary reference frame. The first transformer block 30a, which also acquires the measured angular position of the rotor Mangle, then generates a two-phase voltage Vα, Vβ in the stationary reference frame for the PWM generator block 29. The PWM generator block 29 then generates a three-phase voltage V1, V2, V3 for controlling the inverter 53. The inverter 53 then powers the motor 50 drawing power from the DC source 65.

A regulation loop 60 is thus made up of a slow loop 61 and a fast loop 62, the execution time for the slow loop 61 lying in the range 500 microseconds (μs) to 10 milliseconds (ms), and the execution time of the fast loop 62 being close to 25 μs.

Figure 5:
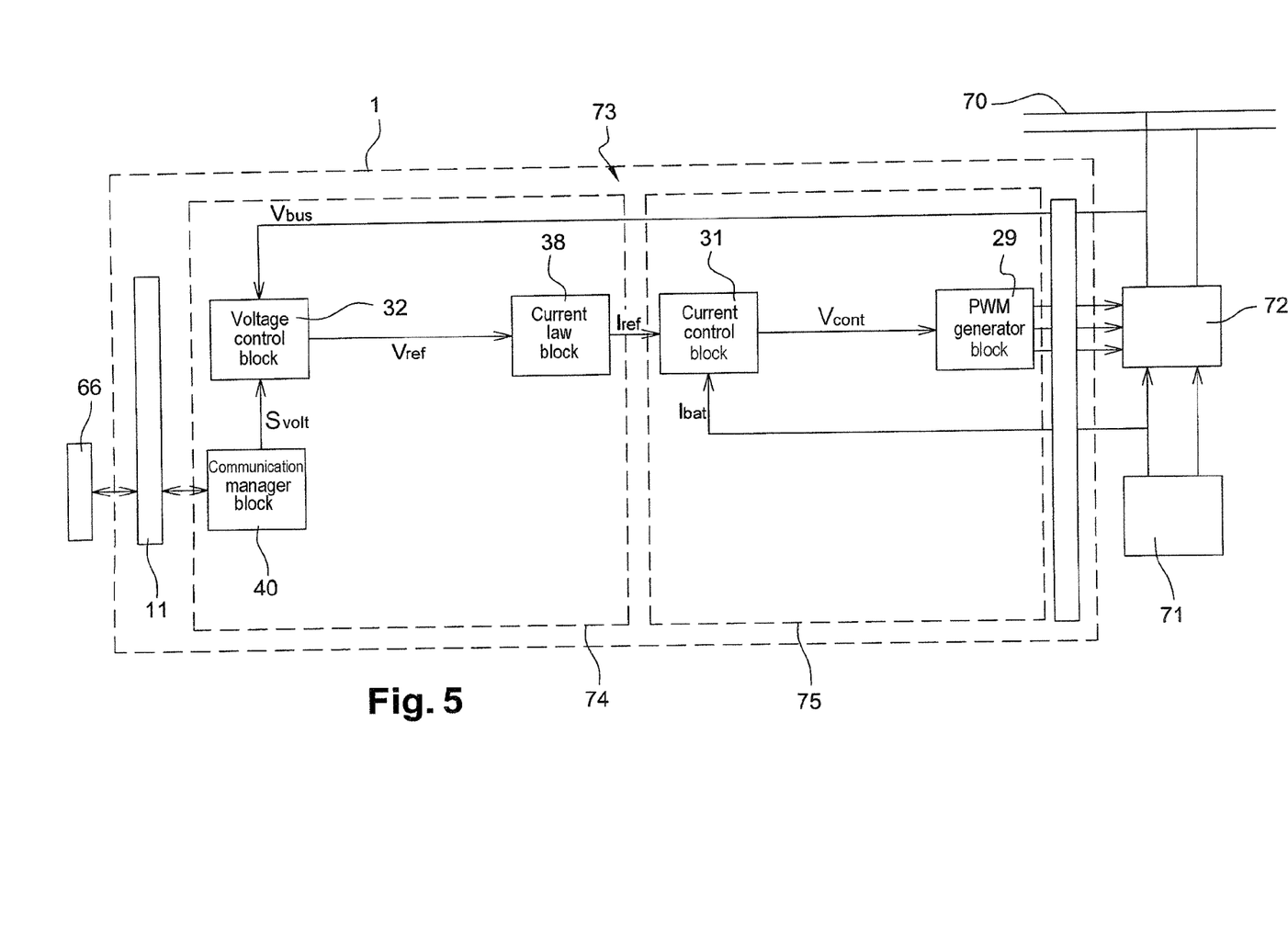
FIG. 5 shows an arrangement of functional blocks for performing a function of performing DC/DC voltage conversion.

There follows a description of a particular arrangement of functional blocks, as shown in FIG. 5, enabling an electrical member 1 to be used in a function of DC/DC voltage conversion for supplying a DC bus voltage Vbus to a bus 70 of an electricity network from a DC voltage Vbat supplied by a battery 71. The electrical member 1 is controlled by a control member 66 that supplies a DC voltage setpoint Svolt to the microcontroller 7 via the communication interface components 11 and a communication manager block 40. The electrical member 1 is also connected via the analog acquisition interface components 12 to an inverter 72 powered by the battery 71.

In addition to the communication manager block 40, the functional blocks implemented in the microcontroller include a voltage control block 32 and a current law block 38.

The functional blocks implemented in the FPGA comprise a current control block 31 and a PWM generator block 29.

Depending on the voltage setpoint Svolt and on the bus voltage Vbus, the voltage control block 32 transmits a reference voltage Vref to the current law block 38. The block 38 supplies a current Iref to the current control block 31, which on the basis of the current value Iref and the current Ibat supplied by the battery 71, generates a control voltage Vcont for the PWM generator 29. The PWM generator then generates a three-phase voltage V1, V2, V3 for controlling the inverter 72 so that it supplies the bus voltage Vbus from the voltage Vbat of the battery 71.

Once more a regulation loop 73 has been provided that is made up of a slow loop 74 and a fast loop 75.

The invention is not limited to the particular embodiments described above, but on the contrary covers any variant coming within the ambit of the invention as defined by the claims.

Although it has been decided to illustrate the invention by using a microcontroller and an FPGA of the static random access memory (SRAM) type, it is possible to replace the microcontroller by any type of component including a processor, and to replace the FPGA by any type of programmable logic component.

The list of functional blocks shown in FIGS. 2 and 3 is naturally not exhaustive. In addition, the control and conversion functions described could perfectly well be performed using additional blocks or different blocks.

Likewise, the list of components present on the circuit card of the electrical member is similarly not exhaustive. It is also possible to make provision for mounting the components on a plurality of circuit cards.

The invention claimed is:

1. A configurable generic electrical member comprising:
processor means for performing at least one configured function in order to generate output signals for at least one piece of electrical equipment, the processor means comprising:
a fast processor unit in which functional blocks are implemented, which functional blocks are arranged respectively to perform relatively fast operations; and
a slow processor unit in which functional blocks are implemented, which functional blocks are arranged respectively to perform relatively slow operations,
the functional blocks of both the fast processor unit and the slow processor unit being independent and parameterizable, and
the fast and slow processor units being configurable to parameterize and interconnect the functional blocks selectively in such a manner as to perform the configured function.

2. The configurable generic electrical member according to claim 1, wherein the processor units are arranged to perform a function of controlling an electric motor and the output signals comprise control signals generated by the function on the basis of a setpoint and measurements of operating parameters of the motor.

3. The configurable generic electrical member according to claim 1, wherein the processor units are arranged to perform a function of converting a DC or an AC voltage into a DC or an AC voltage, and the output signals comprise an output DC or AC voltage.

4. The configurable generic electrical member according to claim 1, wherein the fast processor unit comprises at least one FPGA.

5. The configurable generic electrical member according to claim 1, wherein the slow processor unit comprises a microcontroller using software means.

6. The configurable generic electrical member according to claim 1, wherein the functional blocks include at least one control block.

7. The configurable generic electrical member according to claim 1, wherein the functional blocks include at least one protection block.

8. The configurable generic electrical member according to claim 1, wherein the functional blocks include at least one calculation block.

9. The configurable generic electrical member according to claim 1, wherein the functional blocks comprise a transformer block for transforming from a stationary reference frame associated with the stator of an electric motor to a rotary reference frame associated with the rotor of the motor, or for transforming from a rotary reference frame to a stationary reference frame.

10. The configurable generic electrical member according to claim 1, wherein the functional blocks comprise a transformer block for passing from a two-phase reference frame to a three-phase reference frame or from a three-phase reference frame to a two-phase reference frame.

* * * * *